Figure 1:
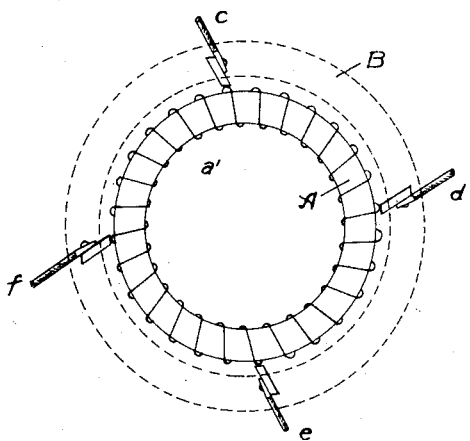

No. 869,186. PATENTED OCT. 22, 1907.
M. C. A. LATOUR.
SHUNT WOUND SELF EXCITED ALTERNATOR.
APPLICATION FILED AUG. 8, 1903. RENEWED FEB. 27, 1907.

2 SHEETS—SHEET 1.

WITNESSES:

INVENTOR:
Marius Charles Arthur Latour,
by
Atty.

No. 869,186. PATENTED OCT. 22, 1907.
M. C. A. LATOUR.
SHUNT WOUND SELF EXCITED ALTERNATOR.
APPLICATION FILED AUG. 8, 1903. RENEWED FEB. 27, 1907.
2 SHEETS—SHEET 2.
Fig. 4.
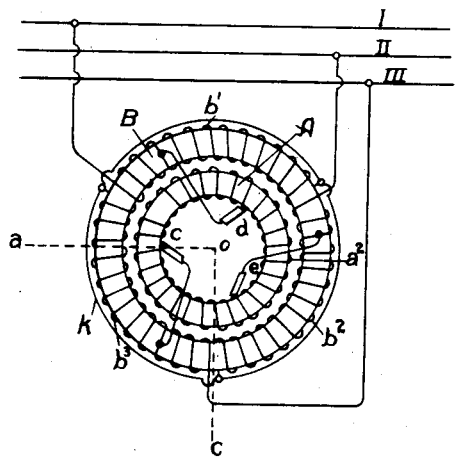
Fig. 5.
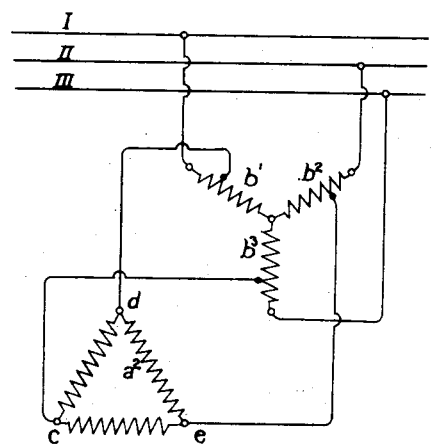
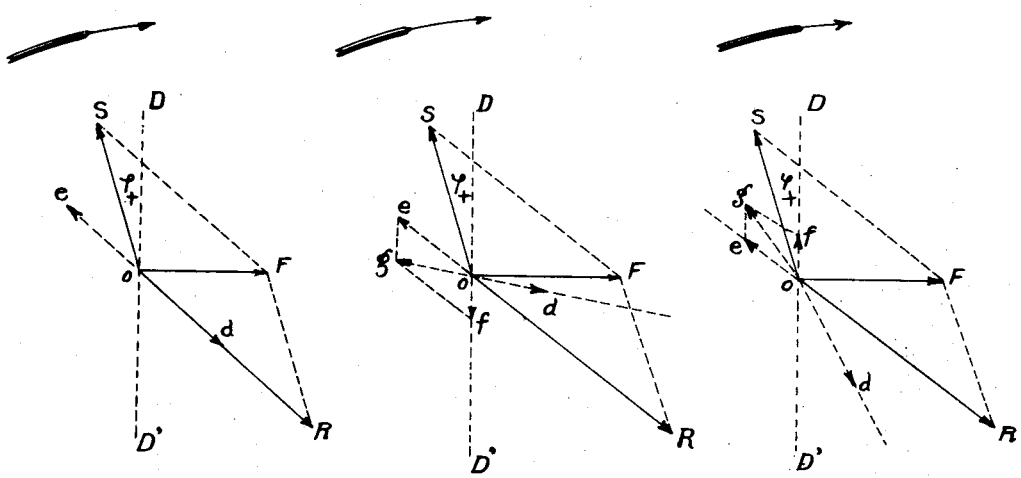
Fig. 6. Fig. 7. Fig. 8.
WITNESSES:
INVENTOR:
Marius Charles Arthur Latour.
by
Atty.

UNITED STATES PATENT OFFICE.

MARIUS CHARLES ARTHUR LATOUR, OF SÈVRES, FRANCE, ASSIGNOR TO GENERAL ELECTRIC COMPANY, A CORPORATION OF NEW YORK.

SHUNT-WOUND SELF-EXCITED ALTERNATOR.

No. 869,186.     Specification of Letters Patent.     Patented Oct. 22, 1907.

Original application filed July 9, 1901, Serial No. 67,668. Divided and this application filed August 8, 1903, Serial No. 168,759. Renewed February 27, 1907. Serial No. 359,610.

*To all whom it may concern:*

Be it known that I, MARIUS CHARLES ARTHUR LATOUR, a citizen of France, residing at Sèvres, Department of Seine-et-Oise, France, have invented certain new and useful Improvements in Shunt-Wound Self-Excited Alternators, of which the following is a specification.

This case is a division of my application, Serial No. 67,668, filed July 9, 1901.

This invention has for its object improvements in self-excited alternating current shunt wound dynamos comprising an armature (which will, for convenience, be hereinafter termed a stator) and a field structure (rotor), the latter provided with a continuous current armature winding connected to a multi-segmental commutator.

In order that the following description and claims be well understood it is necessary to define the sense in which I use certain expressions.

A machine is said to be synchronous whenever the induced magnetic field is fixed in a position with respect to the iron of the field or rotor and conversely a machine is stated to be asynchronous whenever the induced magnetic flux is not fixed in position relatively to the iron of the rotor.

In the following description of my improved alternator I shall use the expression synchronous or synchronous machine as applying to machines in which the degree of departure from the strictly synchronous machine, as defined in the preceding paragraph, is of the magnitude of the slip in well-built induction machines. The slip may be either positive or negative.

In order to emphasize certain characteristics of my improved alternator I wish to refer briefly to a motor described in German Patent No. 61951 of 1891. This motor consisted of a polyphase field (stator) and of a direct current armature (rotor) including commutator and brushes. The armature with commutator (rotor) was connected indifferently, by means of a switch, either in parallel or in series with the polyphase field. This motor was intended to run at any speed whatsoever and as experimentally built was connected only in series.

As it will be further explained in the description of my improved alternator it would have been impossible to connect the stator and rotor in parallel and to run synchronously without changing the winding of the direct current armature, substituting therefor a fine wire winding of high resistance (twenty or thirty times more resistant than the winding of the stator). If this change had been made the motor would have no longer possessed the properties of the motor described in the German Patent 61,951, that is to say, it could not have run at any and all speeds, but it would have run at a substantially synchronous speed.

The motor modified as above will work as a self-exciting shunt wound generator and it is this machine which I will now proceed to describe and claim in detail.

Figure 2:
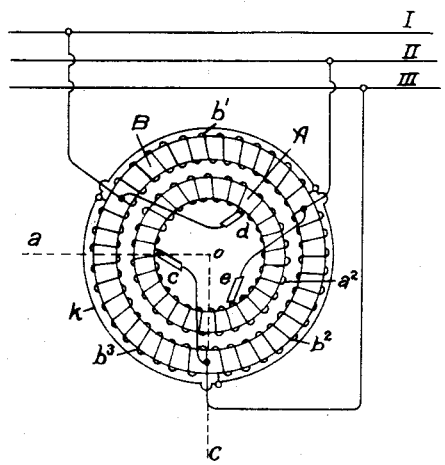
Figure 3:
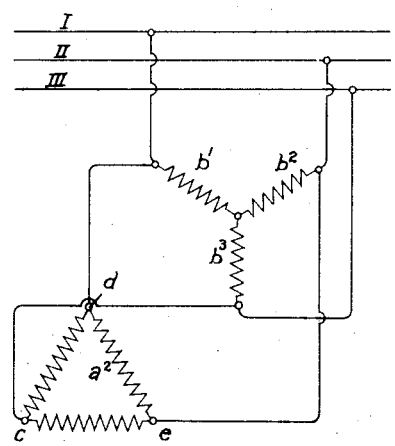

Figure 1 is a diagram illustrating the general principle on which the construction of my improved alternator is based, assuming that two-phase currents and a bi-polar machine are being dealt with. Fig. 2 is a diagrammatic representation of my shunt alternator with rotor wound for the full stator voltage and Fig. 3 is a diagram of connection of this machine. Fig. 4 shows my shunt alternator with rotor connected to a portion of the stator winding and Fig. 5 is a diagram of connection thereof. Figs. 6, 7 and 8 are diagrams of E. M. F's of assistance in explaining the operation of the alternator.

The fundamental principle of the excitation of my alternator may be explained as follows:

Referring to Fig. 1, assume a stationary ring A with closed circuit winding the conductors of which are laid bare on the periphery so as to form a commutator to be placed within a homogeneous magnetic medium such as a ring B of soft iron, from which it is separated only by a small air gap. To four brushes $c\ d\ e\ f$ set 90° apart from each other, let two-phase currents of frequency $w$ be supplied; the brushes $c\ e$, for instance, serving for the passage of the current $I \sin. 2\pi w\ t$, and the brushes $d\ f$ for the passage of the current $I \cos. 2 \pi w\ t$. A magnetic flux is thus obtained in the ring A and rotating therein with an angular velocity equal to $w$. The rotation of this flux involves losses in the iron ring due to hysteresis and Foucault currents and this rotation is further rendered evident by the creation of a reactive E. M. F. at the brush terminals $c\ d\ e\ f$.

With the ring A stationary and neglecting, for the present the possible sparking at brushes $c\ d\ e\ f$, assume these four brushes to be rotated in a direction opposite to that of the rotating flux and at an angular velocity equal to $w$; we shall, by this means immediately insure the fixation of the magnetic flux with respect to the ring A. In this case there will be no losses caused by hysteresis or Foucault currents and the ring may then be either solid or laminated.

It is still more remarkable that the system shown in Fig. 1 is devoid of self-induction when excited by polyphase currents, owing to the fact that the brushes are rotated. As a matter of fact the resulting magnetic flux becoming stationary relatively to the conductors of the ring A cannot therefore induce any E. M. F. whatsoever in these conductors. All induction phenomena therefore disappear and the voltage between the brushes becomes equal to the ohmic drop in the winding of the ring. In other words, the system, although it enables an inducing flux to be obtained does not take wattless currents from the source of three-phase currents and, in the system under consideration, the bi-polar inductor is excited by alternating currents at unity power factor. If instead of rotating the brushes, we leave them stationary, and cause the ring A and its winding to rotate with the speed of synchronism, we have an inducing system revolving in space after the fashion of the inducing field of an alternator with fixed armature.

I have, in the foregoing description, reserved the question of sparking at the brushes $c\ d\ e\ f$ for later consideration. It is now easy to see that there cannot be any sparking and a simple way of accounting for this is that as each section of the ring winding is always traversed by the same magnetic flux, there cannot be any E. M. F. induced therein while it is short-circuited under the brushes.

In discussing the question of commutation it is not necessary to introduce therein the notion of the self-induction of the sections of the winding short-circuited under the brushes, whenever the resulting magnetic flux is fixed in position, magnitude and form relatively to the rotor, that is to say, whenever the fundamental flux is not complicated by harmonic variations thereof. Sparkless commutation may be explained either by reference to the phenomena of self induction in the sections short-circuited under the brushes or by the aid of the assumption of fixity of magnetic flux in the commutated rotor winding.

It is evident that either one of these two hypotheses may be used independently of the other and furthermore that it is unnecessary to make use of both. I prefer to explain the sparkless commutation of the rotor of my improved alternator by means of the latter assumption, that is, fixity of magnetic flux.

Let us now place the bipolar field magnet of Fig. 1 (which we shall refer to as the "rotor") in the "stator" of a bipolar-$p$-phase alternating current machine and let us suppose that the excitation is produced with -$p$- phase currents. The rotor, turning with an angular speed equal to $\omega$ and being separately excited from any convenient source, will induce necessarily a certain potential difference between the terminals of the stator. These potential differences will have a frequency equal to $\omega$, and they could therefore be used, if we choose, for the excitation of the rotor itself, in other words, we could obtain, in this manner, self-excitation. For this purpose it is necessary at first that, as in a continuous current dynamo, the induced voltage be just equal to that selected for the excitation, and it is further required that the induced E. M. F. be in phase with the E. M. F. maintained between the brushes by the source of separate excitation.

We will now explain in what manner the concordance of the phases can be insured by a suitable angular position of the brushes. By giving the brushes an angular advance in the direction of rotation of the rotor, the inducing field in the rotor will advance on itself in space and the induced E. M. F. will advance correspondingly in time. The converse phenomena will occur if the brushes are displaced backwards, that is to say, in the direction opposite to the movement of the rotor. There is therefore a position of the brushes in which the concordance of the phases between the E. M. F. of the stator and the E. M. F. between the brushes of the rotor is insured. This concordance being possible, a self excited shunt wound alternator may be obtained by the suppression of the separate source of excitation, the brushes being of course then connected to the terminals of the stator. Such an alternating current machine is diagrammatically illustrated in Fig. 2. It consists of a stator B the terminals of which are E F G and an inducing rotor A with a commutator to which the exciting current is fed by the brushes $c\ d\ e$. In the Fig. 2 we have not shown a separate commutator, which would usually be employed in practice, but we have for the sake of simplicity shown the conductors laid bare on the periphery of the rotor A so as to form a commutator.

If the excitation is taken directly at the terminals of the stator (Fig. 2), even for the low voltage of 110 or 220 volts, a winding of fine wire and of a great number of turns per commutator segment is required. The influence of the harmonic magnetic fluxes on the commutation would then become very important and furthermore the winding would be impracticable.

The excitation can however be made at a lower voltage either by connecting the brushes of the rotor to points nearer the neutral point of the stator as shown in Fig. 5, that is, by using fewer turns only of the stator winding or by means of a transformer for lowering the voltage.

Residual magnetism suffices generally for starting and the alternator of Fig. 2 operates as a three-phase alternating current generator with its rotor excited by alternating currents.

When the stator gives out current, the phases of the E. M. F's at the terminals of the stator are modified in time and for the purpose of maintaining the rotation of the magnetic field flux synchronous with respect to the rotor, it is necessary to displace the brushes in the direction of the movement of the rotor.

When the brushes are not sufficiently displaced to obtain synchronous rotation of the magnetic flux relatively to the rotor the frequency of the stator currents decrease in a definite manner and the magnetic flux rotates less rapidly than the rotor. If, on the contrary, the brushes are displaced too far, the flux rotates more rapidly than the rotor. In any case the angular position of the brushes, in my shunt alternator, which insures the absolute fixity of magnetic flux relatively to the rotor, may be compared to the position of the brushes in a shunt wound direct current dynamo whenever the brushes are fixed at right angles to the resultant magnetic flux of the armature and of the fields, because both these angular displacements correspond to zero flux variations in the sections of the rotor winding short-circuited by the brushes and consequently to sparkless commutation.

The graphical representation of operation of my improved alternator may be of interest. In Fig. 6, O, S, represents the ampere turns of the armature, and O, R, the ampere turns of the field; the resultant ampere turns are consequently indicated by O F. O D, 90 degrees behind O F, represents the electromotive force induced in the armature by the resultant flux. The angle S O D indicated by $\Phi$ consequently represents the angle of lag. Now, if the angular speed of the field body is represented by V and the frequency of the currents induced in the armature by N, when V equals N the field structure is rotating in synchronism with the rotating flux and consequently no electromotive force can be induced in the field winding. As has been heretofore explained, the field circuit must consequently be non-inductive and the electromotive force impressed upon the commutator brushes is consequently in phase with the field current, that is, in phase with the line O R, and may be represented by the line O d in phase with O R and in opposition to O e, which represents the ohmic drop in the field winding. The phase angle between the electromotive forces impressed upon the armature terminals and commutator brushes, corresponds to the physical angle between the armature terminals and the brush position, that is, in order to secure an adjustment of the brushes such that the speed of the field body equals the frequency of the armature currents, the angle between the field terminals and the commutator brushes which is represented by C o a in Fig. 2, must be equal to the angle D O d in Fig. 6.

It is evident that any variation in the angle S O D or in the length of the line O S will produce variation in position of the line O R, and consequently of the line O d in phase therewith. In other words, any variation in the power factor or magnitude of the armature current alters the position at which the brushes must be set in order to attain the relation N=V. Consequently if the brushes are set to give this relation for a given load and power factor, and if the load or power factor varies, the frequency of the armature currents will no longer be equal to the speed of the field body. Or, in other words, the brushes are incorrectly set to produce the relation N=V. On the other hand, if the brushes are properly set to produce this relation and are then shifted, the equality between N and V will be destroyed.

Figs. 7 and 8 show graphically the conditions when the brushes are incorrectly placed. If N is greater or less than V the field structure is slipping with reference to the revolving flux, and this slip may be positive or negative according as the rotor speed is greater or less than the frequency of the armature current. Fig. 7 shows the brushes shifted so as to make an angle D O d smaller than the angle D O R. The line O f 90 degrees ahead of the line O F represents the electromotive force induced in the field winding due to the slip, and the line O d is equal and opposite to the line O g which represents the resultant of the line O f and the line O e. Fig. 8 represents the condition when the brushes are shifted in the opposite direction so as to increase the angle D O d. In this case the line O f is reversed in direction, but as before, the line O d is equal and opposite to the resultant of O f and of O e. From these diagrams it is consequently evident that for every load and power factor there is one position of the brushes, for which the speed of the rotor body is equal to the frequency of the armature currents, while for any other position of the brushes for that load and power factor this equality would be destroyed.

In the above discussion it has been assumed that the armature and field are similarly connected, that is, in delta or in Y. If they are not similarly connected, it is of course no longer true that the phase angle between the electromotive force impressed upon the armature terminals and commutator brushes correspond directly to the actual physical angle between the armature terminals and the brush position, but on the contrary allowance must be made for the difference in phase due to the difference in connection; that is, if the armature and field are connected one in Y and the other in delta, as shown in Fig. 2, the angle C o a no longer corresponds directly to the angle D O d in Fig. 6, but the necessary correction must be made for the difference in phase produced by the change from Y to delta.

A shunt wound alternating current generator can of course work as a motor. In this case it is necessary, with increase in the load, to displace the brushes in the direction opposite to that of the movement of the rotor. If this is not done, the speed of the rotor decreases. It is advantageous to operate my improved shunt wound alternators with the magnetic flux and the rotor in absolute synchronism when the machine is carrying full load, but I wish to claim, not only those machines which run at absolutely synchronous speed as above defined, but also those machines which run at nearly synchronous speeds, the degree of departure from synchronous speed being of the order of the slip in well designed induction machines. It is, of course, to be understood that the slip may be positive or negative. Furthermore, a machine built in conformity with the present description cannot run at any and all speeds but must operate at or very near the synchronous speed as above defined.

What I claim as new and desire to secure by Letters Patent of the United States is:

1. In combination, an alternating-current generator comprising relatively rotatable members one of which is mechanically driven and each of which is provided with a distributed winding, a commutator for one of said windings, brushes bearing on said commutator, polyphase connections from said brushes to the other winding whereby the two windings are connected in parallel, and a load-circuit supplied with current from said generator.

2. A self-exciting alternating-current generator comprising two relatively rotatable members one of which is mechanically driven and each of which is provided with a distributed winding, a commutator for one of said windings, brushes bearing on said commutator, and polyphase shunt connections betwen said brushes and the other winding whereby a rotary magnetic field is produced in said generator and the generator thus excites itself independently of any external source.

3. In combination, an alternating-current generator comprising relatively rotatable members, one of which is mechanically driven and each of which is provided with a distributed winding, polyphase shunt connections joining together said windings to provide paths for currents whereby the generator becomes self-exciting, and a load circuit supplied with current from said generator.

In witness whereof I have hereunto set my hand this 20th day of July, 1903.

MARIUS CHARLES ARTHUR LATOUR.

Witnesses:
A. S. GARFIELD,
AUGUSTUS E. INGRAM.